(12) United States Patent
Carlson

(10) Patent No.: US 12,314,871 B2
(45) Date of Patent: May 27, 2025

(54) METRICS FRAMEWORK FOR RANDOMIZED EXPERIMENTS

(71) Applicant: Stripe, Inc., San Francisco, CA (US)

(72) Inventor: Kyle Carlson, San Francisco, CA (US)

(73) Assignee: Stripe, Inc., San Francisco, CA (US)

( * ) Notice: Subject to any disclaimer, the term of this patent is extended or adjusted under 35 U.S.C. 154(b) by 774 days.

(21) Appl. No.: 17/164,277

(22) Filed: Feb. 1, 2021

(65) Prior Publication Data

US 2022/0245480 A1 Aug. 4, 2022

(51) Int. Cl.
| | |
|---|---|
| G06Q 30/0201 | (2023.01) |
| G06F 16/24 | (2019.01) |
| G06N 5/02 | (2023.01) |
| G06N 5/04 | (2023.01) |
| G06N 20/00 | (2019.01) |
| G06Q 30/0204 | (2023.01) |

(52) U.S. Cl.
CPC .............. *G06N 5/04* (2013.01); *G06F 16/24* (2019.01); *G06N 5/027* (2013.01); *G06N 20/00* (2019.01); *G06Q 30/0201* (2013.01); *G06Q 30/0204* (2013.01)

(58) Field of Classification Search
CPC .......... G06N 5/04; G06N 20/00; G06N 5/027; G06F 16/24
See application file for complete search history.

(56) References Cited

U.S. PATENT DOCUMENTS

| | | | | |
|---|---|---|---|---|
| 9,665,890 | B1* | 5/2017 | Kent ................... | G06Q 30/0272 |
| 2012/0089455 | A1* | 4/2012 | Belani ................ | G06Q 30/0245 |
| | | | | 705/14.44 |
| 2015/0142551 | A1* | 5/2015 | Papakipos .......... | G06Q 30/0272 |
| | | | | 705/14.58 |
| 2016/0048855 | A1* | 2/2016 | Ambrozic .......... | G06Q 30/0203 |
| | | | | 705/7.32 |
| 2017/0193530 | A1* | 7/2017 | Newsum ............ | G06Q 30/0281 |
| 2018/0096365 | A1* | 4/2018 | Noyes .................... | G06Q 40/04 |
| 2019/0108546 | A1* | 4/2019 | Goodyear .......... | G06Q 30/0239 |
| 2019/0122251 | A1* | 4/2019 | Hoffman ............ | G06Q 30/0242 |
| 2019/0289058 | A1* | 9/2019 | Bhoj ................. | G06Q 10/06375 |
| 2020/0097997 | A1* | 3/2020 | Li ........................... | G06N 20/00 |
| 2020/0211021 | A1* | 7/2020 | Allbright ........... | G06Q 20/4016 |
| 2021/0250401 | A1* | 8/2021 | Sundaresan ......... | H04L 67/1091 |
| 2021/0312221 | A1* | 10/2021 | Chen .................. | G06Q 30/0241 |
| 2021/0390578 | A1* | 12/2021 | Calabrese .......... | G06Q 30/0246 |

OTHER PUBLICATIONS

Author(s): Lewis R Title: Measuring the returns of advertising Journal: Oxford [online]. Publication date: 2015. [retrieved on: Jun. 16, 2023 ]. Retrieved from the Internet: < URL:https://academic.oup.com/qje/article/130/4/1941/1914592 > (Year: 2015).*

* cited by examiner

*Primary Examiner* — Incent M Cao

(74) *Attorney, Agent, or Firm* — Foley & Lardner LLP

(57) ABSTRACT

In an example embodiment, input data for an experiment is automatically formatted and organized using a framework that presents a graphical user interface that is simple and flexible. The graphical user interface allows the user to make certain selections without allowing the user to make any changes that would cause the results of the experiment to be negatively affected. The framework also enforces temporal guarantees. Specifically, the framework enforces that an outcome being used to calculate a metric be measured after an exposure related to the outcome has occurred.

15 Claims, 8 Drawing Sheets

METRICS FRAMEWORK FOR RANDOMIZED EXPERIMENTS

TECHNICAL FIELD

The subject matter disclosed herein generally relates to the technical field of data experiments utilized in a network-based computing environment.

BACKGROUND

The present subject matter seeks to address technical problems that exist in developing and operating data experiments.

SUMMARY

Randomized experiments are often performed to compare performance of various changes in a computer system. For example, when making a change to a machine-learned model one will often compare the changed and old versions of the model using an experiment in which traffic is stochastically assigned to one of the two models. The experiment is run before the changed model is "shipped" or otherwise used (shipped meaning that the changed model is used in place of the old model, in the ordinary manner in situations where the old model was previously used, such as by end-users). These experiments often will measure one or more metrics in data output by the changed model and compare these metrics to the data output by the old model.

For example, a metric may be the authorization rate of credit card charges, and the experiment may compare an old software process for authorizing credit cards with a new software process for authorizing credit cards.

The experiments involve various actions taken on input data. In the case of comparing two models, the input data will be data that is output by each of the two models and other software involving processes. How the data is organized and processed can drastically alter the reliability and correctness of an experiment's results. In some cases, it can be difficult for a test administrator to configure data output, organization, and processing rules in a manner that does not negatively impact the results of an experiment.

This problem is compounded by the fact that it is common for experiments to be performed on large amounts of data for events that occurred in the past, even though the data may not be received in the same order in which the underlying events occurred.

BRIEF DESCRIPTION OF THE DRAWINGS

Some embodiments are illustrated by way of example and not limitation in the figures of the accompanying drawings.

DETAILED DESCRIPTION

Figure 1:
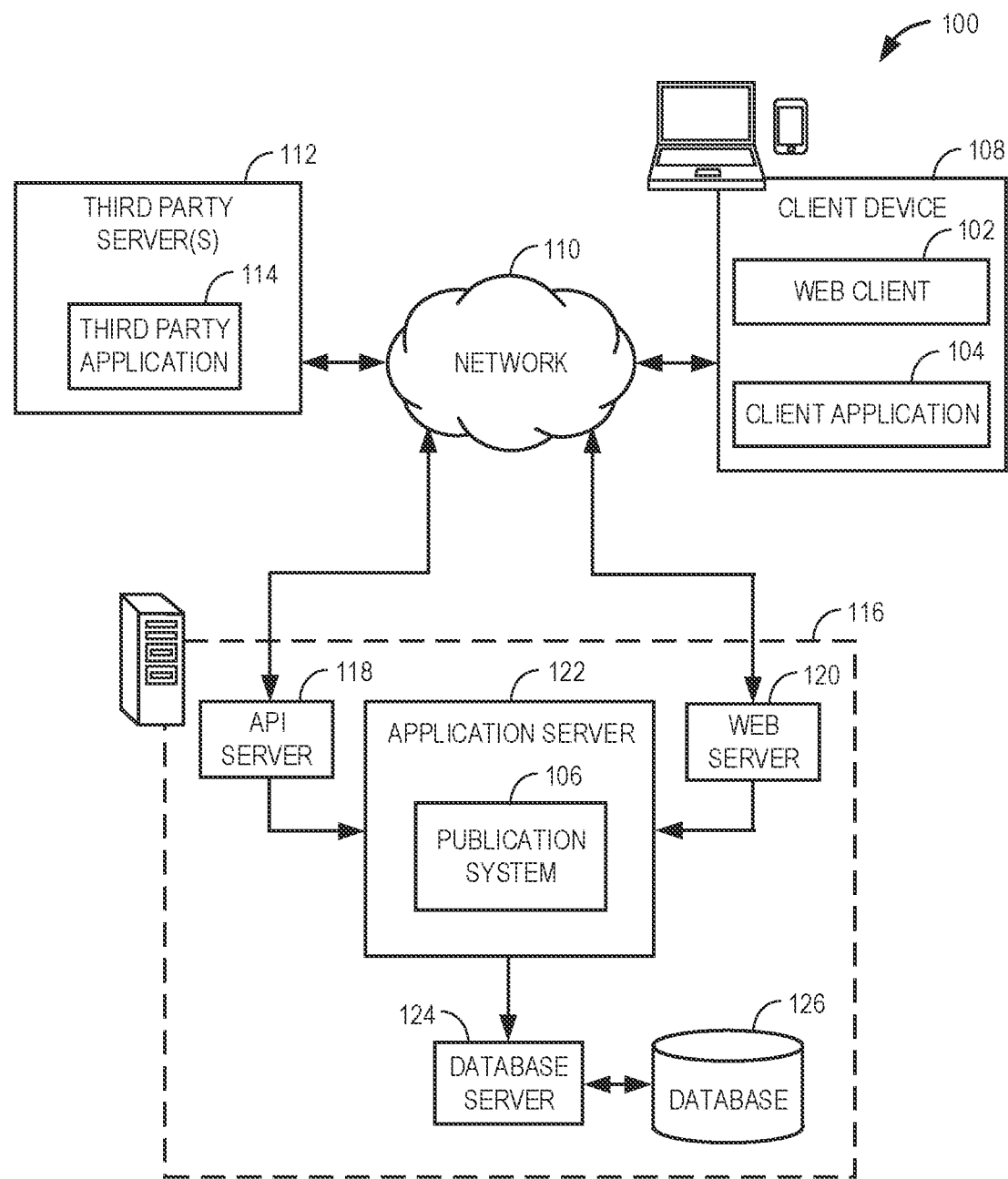
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, input data for an experiment is automatically formatted and organized using a framework that presents a graphical user interface that is simple and flexible. The graphical user interface (or text configuration file) allows the user to make certain selections without allowing the user to make any changes that would cause the results of the experiment to be negatively affected. For example, if a metric for an experiment has a numerator and a denominator, the framework ensures that the numerator and denominator derive from the same set of experiment units and that each unit contributes exactly one value to both the numerator and denominator. The framework also enforces temporal ordering of the experiment events. Specifically, the framework enforces that an outcome being used to calculate a metric be measured after an exposure related to the outcome has occurred. For example, if the outcome being measured is the number of successful credit card authorizations on each credit card, then the framework enforces that only authorizations subsequent to the credit card being exposed to the experiment are counted. In particular, any authorizations on the same credit card but prior to the credit card in question being exposed to the experiment are excluded.

Another negative affect is bias. Bias occurs when the metric numbers do not accurately reflect what is really happening. This could be caused by various problems, including processing the data incorrectly, not logging the necessary data, losing data, including data in the experiment results that shouldn't be included.

Another possible negative effect is the loss of statistical power, i.e., the introduction of noise into the experiment and making the experiment less sensitive to detecting a change between the old version and the new version.

In an example embodiment, the framework divides events into two classes: exposures and outcomes. An exposure event identifies when a particular unit of data has entered into the experiment and which group (control or treatment) the unit has been assigned to. This also allows different units to enter the experiment at different times rather than requiring every unit to be entered at the same time. This can be beneficial as it allows users to roll out an experiment gradually and cautiously while still maintaining the correct data.

An outcome event identifies a property that is subsequently applied to the unit of data in a corresponding exposure event and when that property was applied. For example, in the case of a credit card charge attempt and authorization, the exposure event may identify the merchant, the experiment the attempt is being applied to, the time it was applied to that experiment, and that is was applied to a control group or a treatment group. The outcome event may then identify the unit (so that it can be linked to the corresponding exposure event), a property applied to that unit (e.g., authorized or rejected), and the time that property was applied to the unit.

The framework can also enforce a horizon time window. The horizon time window is a measurement time window for each unit that begins at the exposure time and ends when the horizon time ends. Any outcome event for the unit in that time window is considered to be an outcome event for that unit for purposes of computing a measurement value for the metric.

In an example embodiment, the horizon time window length is fixed. In another example embodiment, the length can be dynamically determined based on a number of different factors. For example, different experiments may be assigned different horizon time window lengths. Alternatively, different types of data may be assigned different horizon time window lengths (e.g., credit card charge attempts have different horizon time window lengths from bank transfer attempts). Alternatively, different values for data may impute different horizon time window lengths (e.g., different merchants may have different horizon time window lengths). In some example embodiments, the horizon time window length is itself learned via a machine learning algorithm, such as a machine learning algorithm described later, trained to output a horizon time window for a given set of inputs.

Furthermore, an outcome reducer function may convert the outcome events in the horizon window into the measurement value. For example, a sum function could be applied to add up all the dollar values of all charges processed in a window. Another example is a 0-1 function that checks whether any charges were processed at all.

Two functions are then applied to the outcome events in the horizon time window. The first function is a map function and the second function is a reducer function. The map function looks for a particular value or property of an individual event. The map function is separately applied to each outcome event in the horizon time window for the unit. The reducer function then aggregates this value or property over all the outcome events in the horizon time window for the unit, based on some function. For example, if the metric is credit card authorization rate, the map function may measure whether each outcome event in the horizon time window for a particular credit card charge event was a successful authorization, and the reducer function may then output an indication of a successful authorization if any of the outcome events in the horizon time window indicated that a successful authorization was made. In another example, if the metric is total sales by a merchant, the map function may determine the total amount of a charge for each successful charge in the horizon time window, and the reducer function may sum those charge amounts.

Based on these components, the framework can then generate an analysis table that has the following columns as a minimum: (1) identifier of the unit; (2) time when the unit entered the experiment; (3) treatment/control group; and (4) numerical measurement. Analysis can then be performed on the experiment by comparing an average of the numerical measurement between the treatment and control groups. A key technical challenge in constructing the table is that one row requires data from numerous events that might be emitted from different systems at different times. The framework is able to specify how to perform this aspect.

In another example embodiment, rather than a graphical user interface being used for the user to specify one or more metrics for an experiment, configuration files are utilized. Specifically, the user indicates the one or more metrics in a configuration file that the framework incorporates as input.

The inputted metrics may then be parsed and mapped to one or more functions needed to calculate the metrics. The functions may be contained in a library of functions. A mapping may be utilized for this purpose. For example, each metric may be mapped in a mapping to one or more functions needed to calculate the metric. To the extent a user supplies a metric that lacks such a mapping, in an example embodiment the framework may suggest one or more functions to the user, based on, for example, the mappings associated with similar metrics.

In one example embodiment, the data may be sliced in different ways than merely for control and treatment groups. In such an embodiment, the framework enforces that whatever value the user is selecting to slice on, it is a value that is fixed at the time of exposure (pre-treatment), and is not a value that occurs after the treatment was applied and thus could have been affected by the treatment itself. In order to enable this embodiment, the exposure events may include additional fields containing values that could potentially be sliced upon (e.g., country). The framework then limits the values that the user can slice upon to those contained in the additional fields of the exposure events.

The framework can also act to prevent a user from applying a filter on a value that is not contained in the exposure event. This prevents cases where a user will inadvertently attempt to filter out data points in a way that disproportionally impacts the treatment group over the control group (causing many more data points to be dropped from the treatment group than the control group).

It should be noted that while this document often describes the use of two different groups (control and treatment), the same techniques may be applied to any number of different groups, and nothing in this document shall be read as limiting the techniques to only a control group and treatment group.

Machine learning (ML) has seen a rise in popularity in recent years due to the availability of massive amounts of training data and advances in more powerful and efficient computing hardware. Machine learning may utilize models that are executed to provide predictions (e.g., fraud detection) in particular applications among many other types of applications.

A machine learning lifecycle may include the following distinct stages: data collection, annotation, exploration, feature engineering, experimentation, training, evaluation, and deployment. The machine learning lifecycle can be iterative from data collection through evaluation. At each stage, any prior stage could be revisited, and each stage can also change the size and shape of the data used to generate the ML model.

A machine learning development lifecycle may be highly-iterative and experimental. For example, experiments involving tens or hundreds of input features and model parameters may be required to produce an accurate and well-calibrated ML model. In an example, a team of users (e.g., developers) conduct experiments and tests with many data inputs, often in both local and distributed (e.g., networked) computing environments.

Existing systems for developing machine learning models can support various phases of the development lifecycle, such as model training, experimentation, evaluation, and deployment. Such systems can utilize various data management systems, such as cloud storage services, distributed file systems, or other database solutions, each of which can vary in the steps to access and utilize by users. Thus, development environments utilized by users (e.g., developers) are often provided in a distributed computing environment in which one or more cloud services and platforms are leveraged.

The machine learning algorithms may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors).

A neural network is a deep learning machine learning model that contains layers of interconnected nodes. Each node is a perceptron and is similar to multiple linear regression. The perceptron feeds the signal produced by multiple linear regression into an activation function that may be nonlinear. In a multi-layered perceptron (MLP), perceptrons are arranged in interconnected layers. The input layer collects input patterns. The output layer has classifications or output signals to which input patterns may map.

Hidden layers fine-tune the input weightings until the neural network's margin of error is minimal. The hidden layers extrapolate salient features in the input data that have predictive power regarding the outputs.

In an example embodiment, the machine learned model may also be retrained later based on feedback received by users or based on additional (e.g., new) training data received since the previous training.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
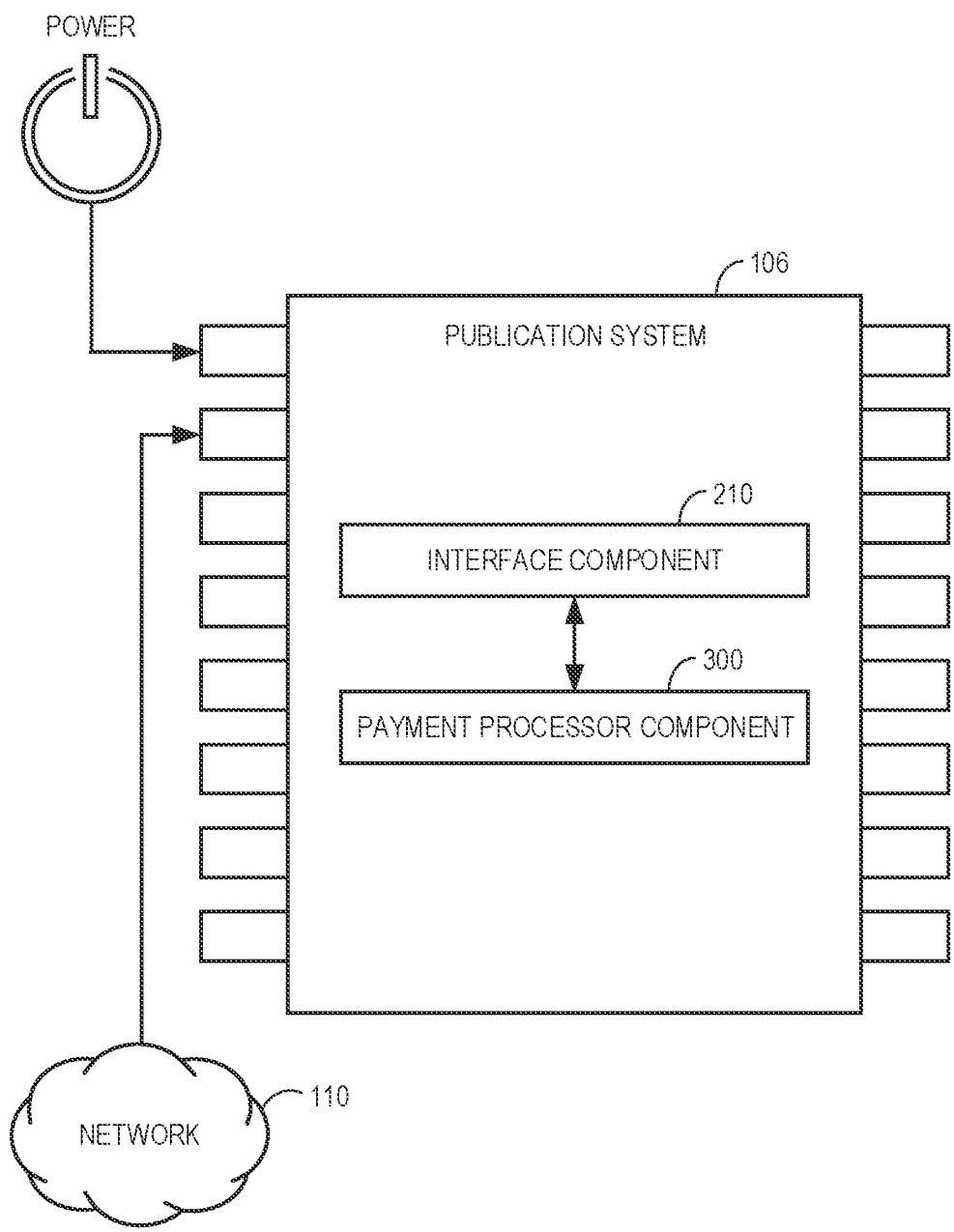
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor in accordance with the methods described herein with reference to the accompanying drawings.

Figure 3:
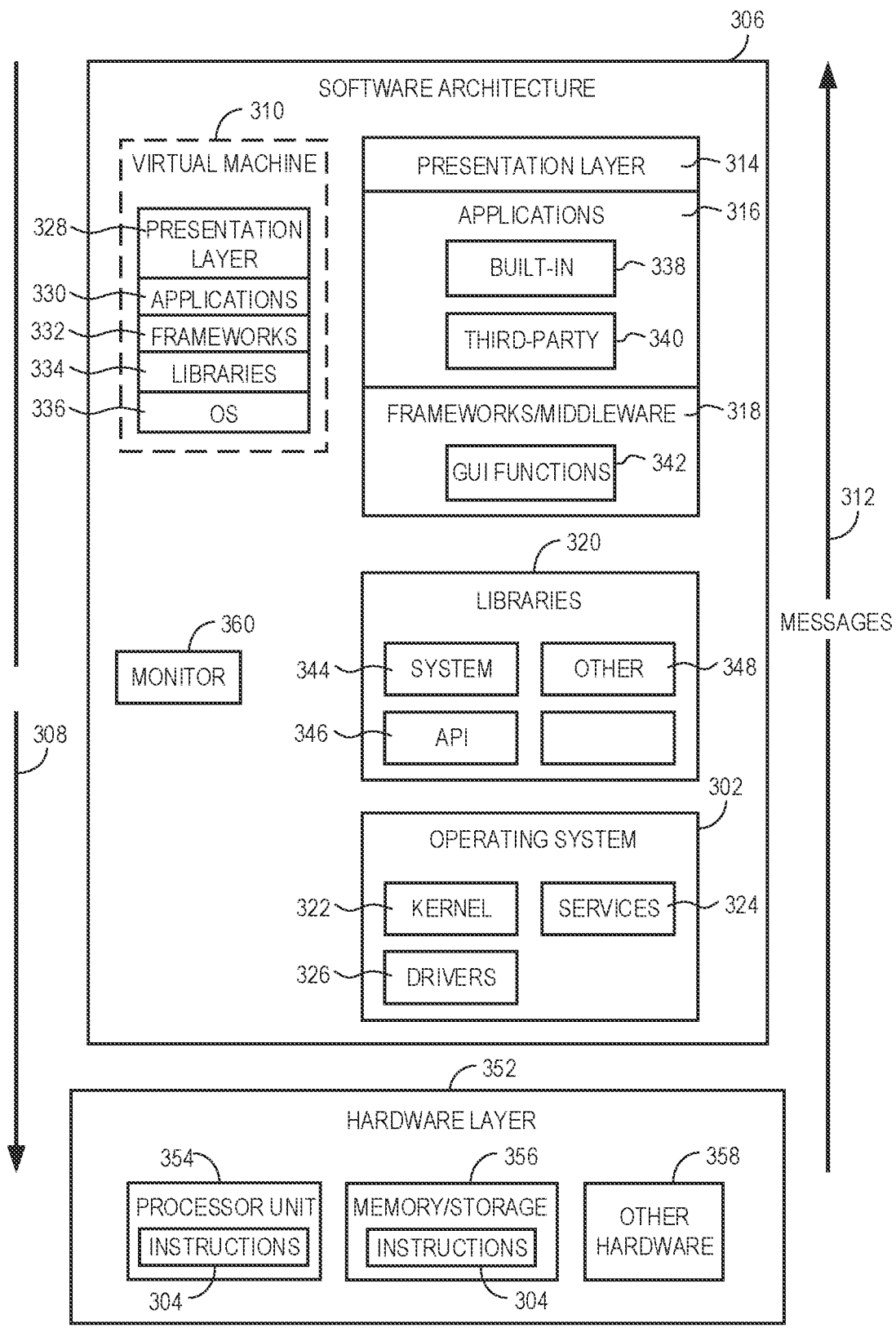
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/ output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
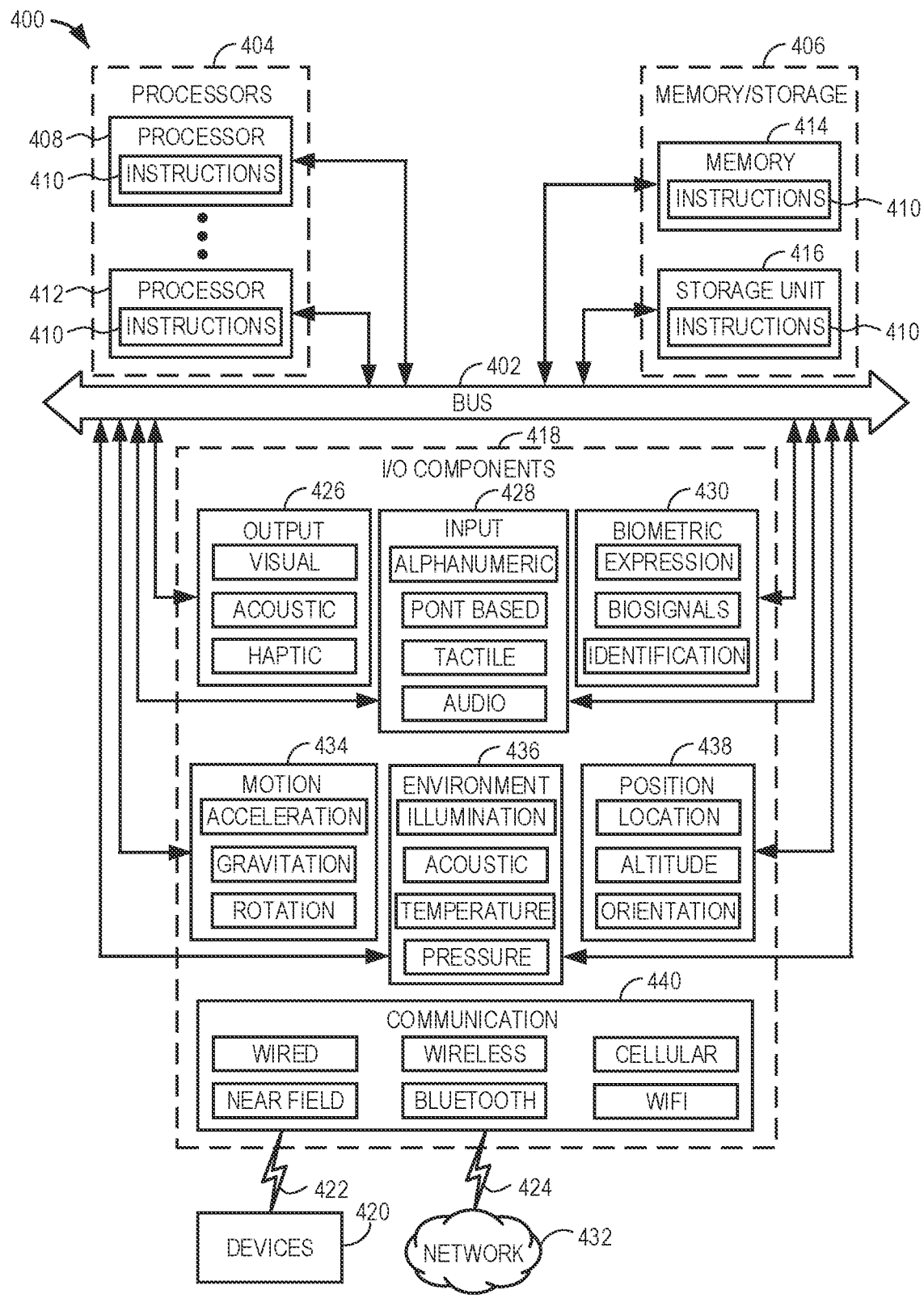
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and/O components 418, which may be configured to communicate with each other such as via a bus 402. The memory/storage 406 may include a memory 414, such as a main memory or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (TP) geo-location, location via Wi-Fi® signal triangulation, location via detecting an NFC beacon signal that may indicate a particular location, and so forth.

Figure 5:
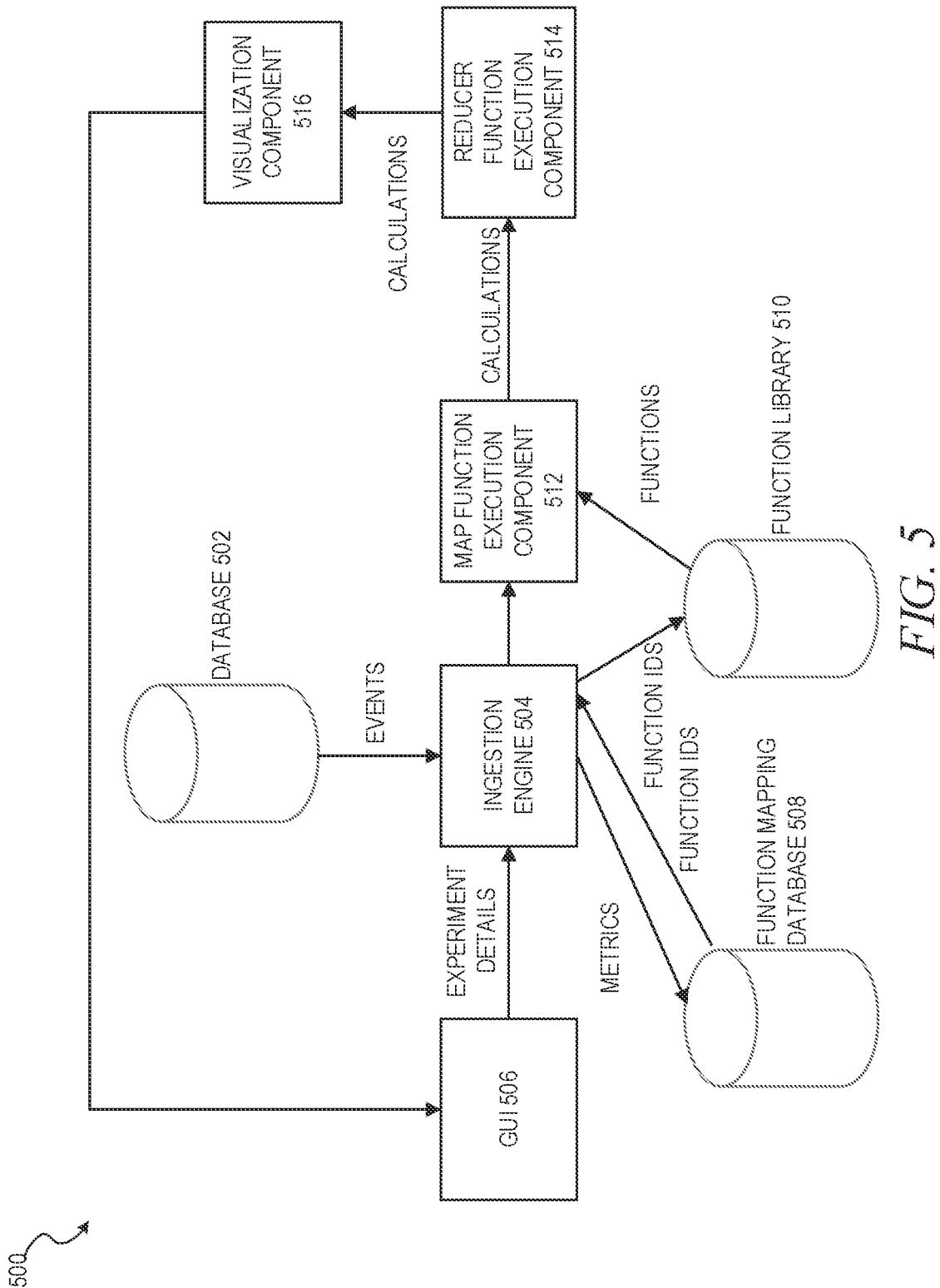
FIG. 5 is a block diagram illustrating an experiment framework architecture in accordance with an example embodiment.

In an example embodiment, the payment processor component 300 may be one source of data stored in a database. The database contains information used for one or more experiments. FIG. 5 is a block diagram illustrating an experiment framework architecture 500 in accordance with an example embodiment. It should be noted that this is merely one example architecture and is not intended to be limiting. Here, the database described above is labeled as database 502. Data from the database 502 (and possibly from other databases and/or other data sources) is ingested by an ingestion engine 504. The ingestion engine 504 acts to parse the data and divide it into two groups: control group and treatment group, and into two classes: exposure events and outcome events. Each exposure event corresponds to a particular piece of data, as identified by a token or other identifier, and has associated with it a time stamp indicating when the corresponding piece of data was assigned to either the control group or the treatment group. Each outcome event corresponds to a particular piece of data that has a token or other identifier matching one of the classified exposure events, as well as a property of the particular piece of data and a timestamp indicating when the property of the particular piece of data occurred or changed. Notably, the ingestion engine 504 acts to ensure that no piece of data is classified as an outcome event for an exposure event with a timestamp that is later than the timestamp of the outcome event.

The ingestion engine 504 also acts to ensure that the timestamp for each potential outcome event for an exposure event is compared with a time horizon window for the exposure event, and that a piece of data corresponding to the potential outcome event is not classified as an outcome event for that exposure event if the time stamp of the potential outcome event is outside of the time horizon window for the exposure event.

The experiment framework architecture 500 also contains a graphical user interface (GUI) 506 where a user sets up an experiment and identifies one or more metrics to be measured as part of the experiment. The user may also use the GUI 506 to establish parameters about what type of data to use for the experiment, and to define the control and treatment groups. This information is then passed to the ingestion engine 504, which uses these parameters in dividing the data into control groups and treatment groups. It should be noted that the GUI 506 is optional and in some example embodiments a configuration file is utilized in lieu of a GUI 506.

The ingestion engine 504 also accesses a function mapping database 508 containing a function mapping between metrics and functions to identify a set of one or more functions to be executed in order to calculate the one or more metrics to be measured as part of the experiment. The corresponding one or more functions may then be retrieved or accessed via a function library 510. Each function may comprise two functions: a map function and a reducer function. As described above, the map function may perform a calculation on each individual piece of data, and specifically on pieces of data classified as outcome events for identified exposure events according to the ingestion engine 504. A map function execution component 512 may perform this map function on each such piece of data. The reducer function may perform some sort of aggregation function on the output of the map function execution component 512 for a group of data (such as all pieces of data corresponding to outcome events for a particular exposure event, such as sharing the same token or other identifier). Examples of aggregation functions include an "if outputs of the map function contain property X, then output true" and "sum the outputs of the map function." A reducer function execution component 514 may perform this reducer function.

The output of the reducer function execution component 514 may be passed to a visualization component 516, which may create a visualization based on the output. In an example embodiment, this visualization may be an analysis table that has the following columns as a minimum: (1) identifier of the unit; (2) time when the unit entered the experiment; (3) treatment/control group; and (4) numerical measurement. Analysis can then be performed on the experiment by comparing an average of the numerical measurement between the treatment and control groups. In some example embodiments, this visualization is then passed to the GUI 506 for display, but in alternative embodiments a different GUI may be utilized to display this visualization or the visualization is simply communicated to a user or other component for later display using some other component or machine.

Figure 6:
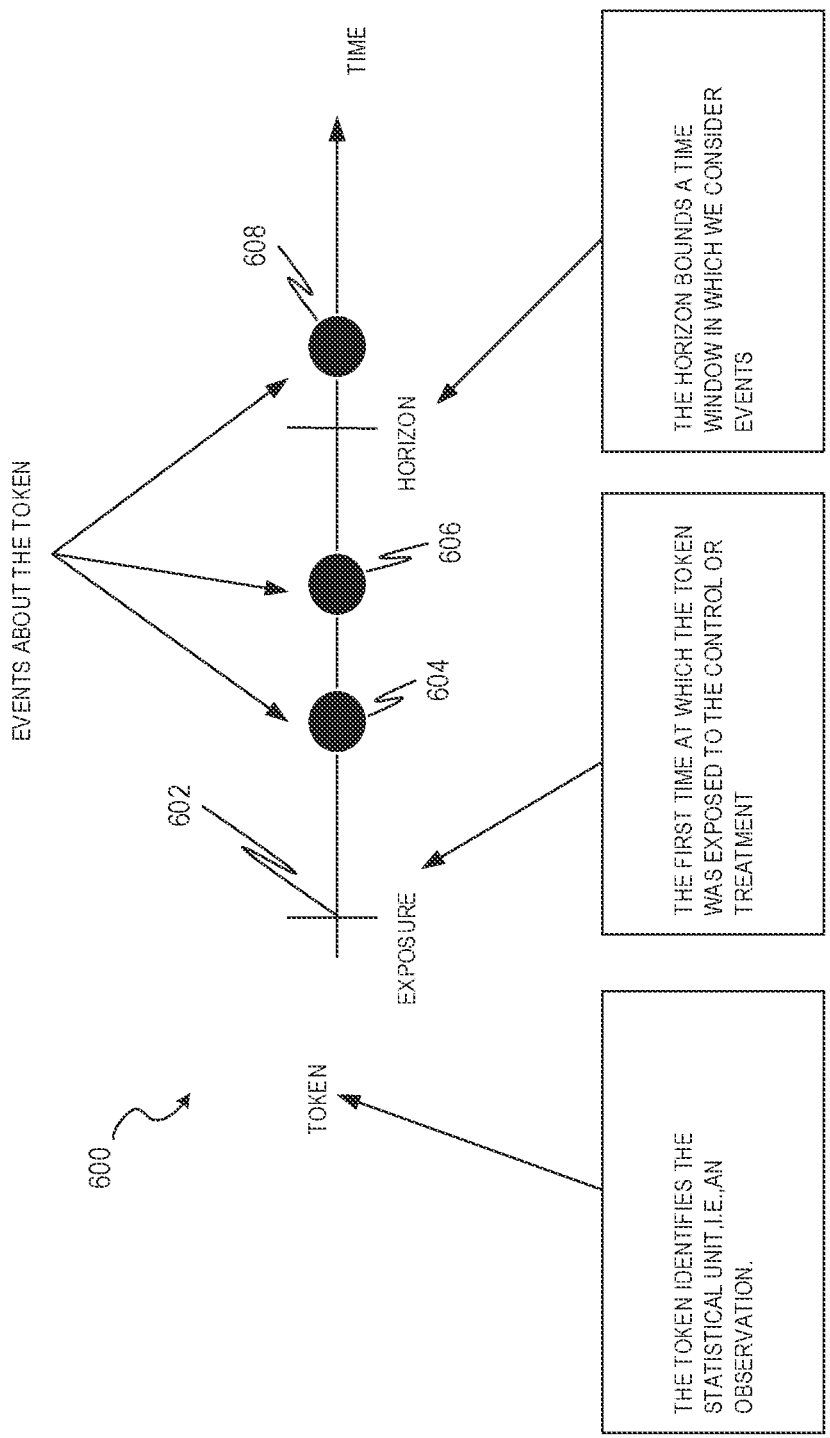
FIG. 6 is a diagram illustrating a time horizon window for an exposure event in accordance with an example embodiment.

FIG. 6 is a diagram illustrating a time horizon window for an exposure event in accordance with an example embodiment. Here, graph 600 depicts pieces of data corresponding to a particular token over time. An exposure event 602 occurs at the first time at which the token was exposed to the control or treatment group. Outcome events 604, 606, 608 occur when events about the token occur in the data. A horizon 610 bounds the time window in which potential outcome events are considered to be actual outcome events for this exposure event 602, based on the time of the exposure event 602 and the time horizon window. Thus, here outcome events 604 and 606 are considered to be valid outcome events for exposure event 602, but outcome event 608 is not, and thus any functions applied to outcome events 604, 606 for purposes of computing a metric for an experiment will not be applied to outcome event 608.

Figure 7:
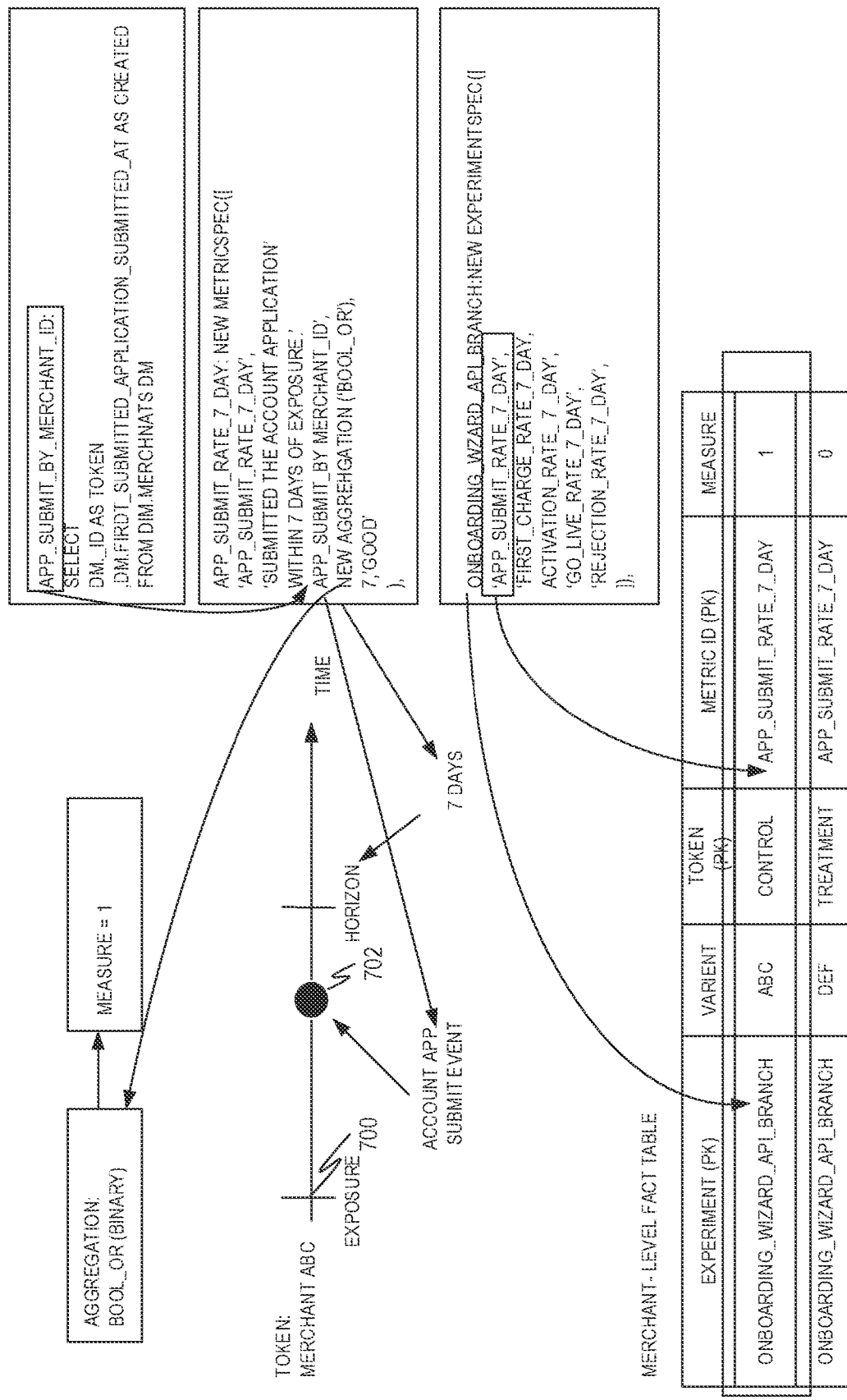
FIG. 7 is a diagram illustrating a computation of a metric in accordance with an example embodiment.

FIG. 7 is a diagram illustrating a computation of a metric in accordance with an example embodiment. Here, the metric is a 7-day application submittal rate, which is the proportion of merchants that submitted an account application within 7 days of exposure. Exposure event 700 defines the exposure time, and an outcome event 702 that occurs during the time horizon window (7 days) for that same token (here, "abc") is counted as an actual outcome event 702 on which a function will be applied. The map function then measures whether a valid application event occurred at the outcome event, and the reducer function aggregates the outputs of the map function and applies an "or" function to them (in this example there is only one output of the map function, but in other cases there will be more than one). The resultant measure (1) is placed in an analysis table 704 (here depicted as a merchant-level fact table).

The following discussion relates to various terms and phrases that are mentioned in the disclosure.

Figure 8:
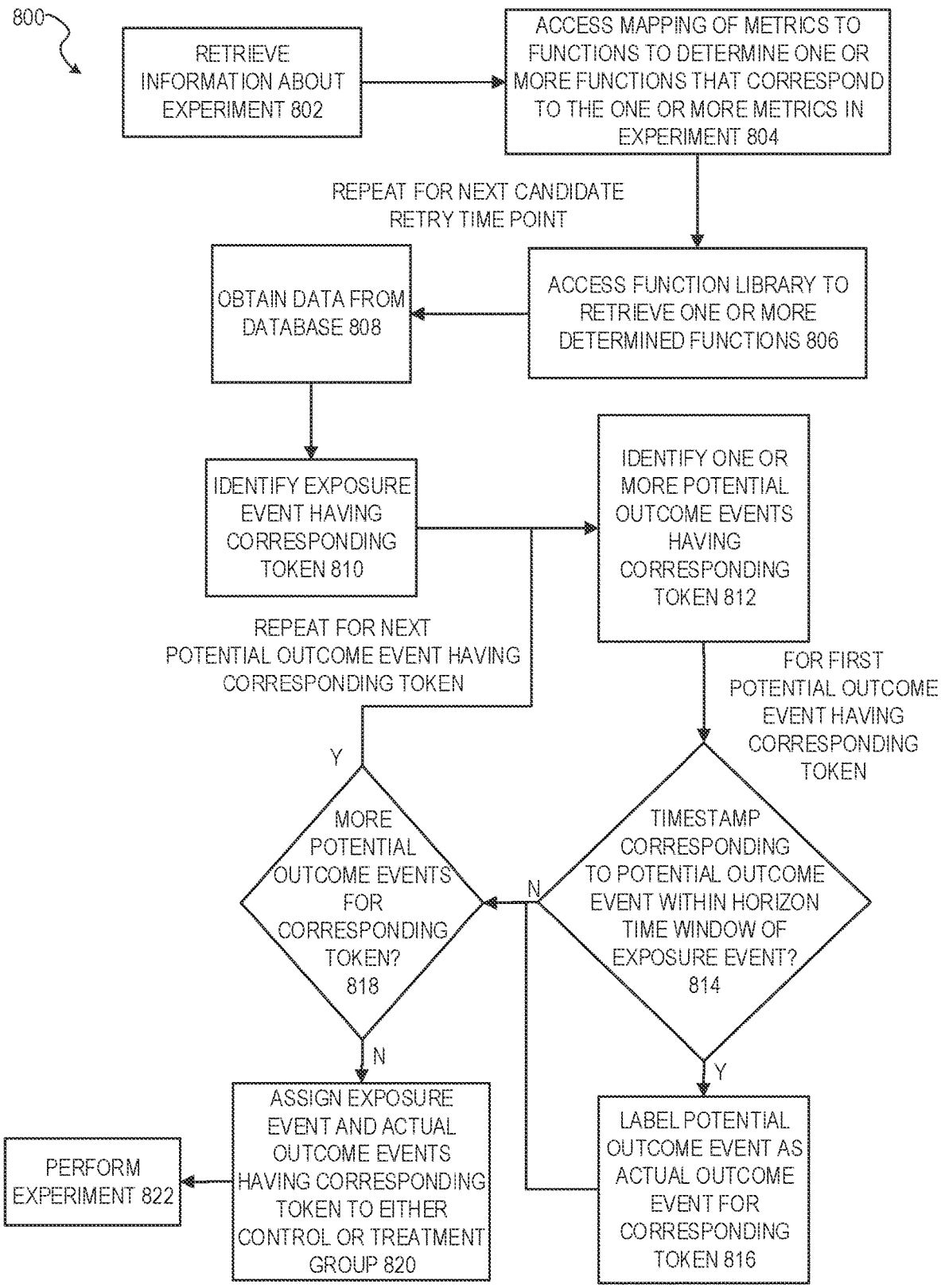
FIG. 8 is a flow diagram illustrating a method for running an experiment using a computer system, in accordance with an example embodiment.

FIG. 8 is a flow diagram illustrating a method 800 for running an experiment using a computer system, in accordance with an example embodiment. At operation 802, information is retrieved about the experiment. The experiment is designed to apply one or more functions to data in a treatment group and compare the results to data in a control group. The information that is received can include an indication of one or more metrics to be determined in the treatment group. This information may be received via a configuration file or via a graphical user interface.

At operation 804, a mapping of metrics to functions is accessed to determine one or more functions that correspond to the one or more metrics in the experiment. At operation 806, a function library is accessed to retrieve the one or more determined functions.

At operation 808, data is obtained from a database. The data includes a plurality of events. At operation 810, an exposure event is identified in the plurality of events. The exposure event has a corresponding token and a timestamp. The timestamp indicates a first time at which the corresponding token was exposed to a control or treatment of the experiment.

At operation 812, one or more potential outcome events having the corresponding token are identified in the plurality of events. Then a loop is begun for each of the one or more potential outcome events having the corresponding token. At operation 814, it is determined whether a timestamp corresponding to the potential outcome event is within a horizon time window of the exposure event. If so, then at operation 816, the potential outcome event is labeled as an actual outcome event for the corresponding token. If not, then the method 800 proceeds to operation 818.

At operation 818, it is determined if there are any more potential outcome events having the corresponding token. If so, then the method 800 loops back to operation 812 for the next potential outcome event having the corresponding token. If not, then at operation 820 the exposure event having the corresponding token and the one or more actual outcome events having the corresponding token are assigned (as a whole) to either a control group or a treatment group of the experiment. At operation 822, the experiment is performed by performing the one or more functions on events in the treatment group. It should be noted that this method 800 only depicts finding and utilizing a single group of exposure events and corresponding exposure events for a single token, but operations 810-818 can be repeated to find and utilize more groups of exposure events and corresponding exposure events for other tokens.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 404 in FIG. 4) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for improving a protocol for configuring a model, the method comprising:
  generating, by a processor, a graphical user interface;
  receiving, by the processor at the graphical user interface, a plurality of user inputs for configuring a plurality of parameters of a network operation evaluation protocol;
  responsive to receiving the plurality of user inputs at the graphical user interface:
    obtaining, by the processor, data from a database, the data including a plurality of events each corresponding to a different network operation authorization;
    identifying, by the processor, an exposure event from the plurality of events, the exposure event having a corresponding token and timestamp, the timestamp of the exposure event indicating a first time at which the corresponding token was exposed to a control or treatment of the network operation evaluation protocol;
    identifying, by the processor and from the plurality of events, one or more potential outcome events having the corresponding token;
    dynamically determining, by the processor, a horizon time window based on a user inputting the plurality of user inputs to generate a set of the one or more potential outcome events that each correspond to a timestamp that is within the horizon time window having a defined end time and beginning with the timestamp of the exposure event having the corresponding token, wherein the processor iteratively generates a set of additional one or more potential outcome events within the horizon time window and having at least a second token;
labeling, by the processor, each potential outcome event of the set of potential outcome events as an actual outcome event;
assigning, by the processor, the exposure event having the corresponding token and one or more actual outcome events having the corresponding token to either a control group or a treatment group of the network operation evaluation protocol; and
executing, by the processor, one or more functions of the network operation evaluation protocol that map to the plurality of user inputs in a function mapping database, wherein the one or more functions are executed based on indications of successful or unsuccessful network operation authorizations of the one or more tokens corresponding to the one or more actual outcome events for the treatment group; and
responsive to the network operation evaluation protocol identifying an increased accuracy in evaluating an updated trained network operation authorization model, over a previous network operation authorization model, deploying, by the processor, the updated trained network operation authorization model for a new event.

2. The method of claim 1, wherein the graphical user interface graphically depicts a difference between results of the network operation protocol for the treatment group and results of the network operation protocol for the control group.

3. The method of claim 1, wherein the one or more functions include applying a machine learned model trained by a machine learning algorithm to learn weights for features in the data.

4. The method of claim 1, wherein the network operation evaluation protocol is defined in a configuration file.

5. The method of claim 4, wherein the configuration file identifies one or more metrics to be measured or calculated during the network operation evaluation protocol.

6. The method of claim 5, further comprising obtaining the one or more functions from a function library based on a mapping between the one or more metrics and the one or more functions.

7. The method of claim 1, wherein the one or more functions include a map function and a reducer function, the map function identifying a particular value or property of an individual event and the reducer function aggregating the particular value or property over a plurality of events.

8. A system comprising:
a network;
one or more processors; and
a memory storing instructions that, when executed by at least one processor among the one or more processors, cause the at least one processor to perform operations comprising:
generating a graphical user interface;
receiving, at the graphical user interface, a plurality of user inputs for configuring a plurality of parameters of a network operation evaluation protocol;
responsive to receiving the plurality of user inputs at the graphical user interface:
obtaining data from a database, the data including a plurality of events each corresponding to a different network operation authorization;
identifying an exposure event from the plurality of events, the exposure event having a corresponding token and timestamp, the timestamp of the exposure event indicating a first time at which the corresponding token was exposed to a control or treatment of the network operation evaluation protocol;
identifying, from the plurality of events, one or more potential outcome events having the corresponding token;
dynamically determining a horizon time window based on a user inputting the plurality of user inputs to generate a set of the one or more potential outcome events that each correspond to a timestamp that is within the horizon time window having a defined end time and beginning with the timestamp of the exposure event having the corresponding token, wherein the at least one processor iteratively generates a set of additional one or more potential outcome events within the horizon time window and having at least a second token;
labeling each potential outcome event of the set of potential outcome events as an actual outcome event;
assigning the exposure event having the corresponding token and one or more actual outcome events having the corresponding token to either a control group or a treatment group of the network operation evaluation protocol; and
executing one or more functions of the network operation evaluation protocol that map to the plurality of user inputs in a function mapping database, wherein the one or more functions are executed based on indications of successful or unsuccessful network operation authorizations of the one or more tokens corresponding to the one or more actual outcome events for the treatment group; and
responsive to the network operation evaluation protocol identifying an increased accuracy in evaluating an updated trained network operation authorization model over a previous network operation authorization model, deploying the updated trained network operation authorization model for a new event.

9. The system of claim 8, wherein the graphical user interface graphically depicts a difference between results of the network operation evaluation protocol for the treatment group and results of the network operation evaluation protocol for the control group.

10. The system of claim 8, wherein the one or more functions include applying a machine learned model trained by a machine learning algorithm to learn weights for features in the data.

11. The system of claim 8, wherein the network operation evaluation protocol is defined in a configuration file.

12. The system of claim 11, wherein the configuration file identifies one or more metrics to be measured or calculated during the network operation evaluation protocol.

13. The system of claim 12, further comprising obtaining the one or more functions from a function library based on a mapping between the one or more metrics and the one or more functions.

14. The system of claim 12, wherein the one or more functions include a map function and a reducer function, the map function identifying a particular value or property of an individual event and the reducer function aggregating the particular value or property over a plurality of events.

15. A non-transitory machine-readable medium comprising instructions which, when read by a machine, cause the machine to perform operations comprising:
generating a graphical user interface;

receiving, at the graphical user interface, a plurality of user inputs at the user interface for configuring a plurality of parameters of a network operation evaluation protocol;

responsive to receiving the plurality of user inputs at the graphical user interface:

obtaining data from a database, the data including a plurality of events each corresponding to a different network operation authorization;

identifying an exposure event from the plurality of events, the exposure event having a corresponding token and timestamp, the timestamp of the exposure event indicating a first time at which the corresponding token was exposed to a control or treatment of the network operation evaluation protocol;

identifying, from the plurality of events, one or more potential outcome events having the corresponding token;

dynamically determining a horizon time window based on a user inputting the plurality of user inputs to generate a set of the one or more potential outcome events that each correspond to that is within the horizon time window having a defined end time and beginning with the timestamp of the exposure event having the corresponding token, wherein the processor iteratively generates a set of additional one or more potential outcome events within the horizon time window and having at least a second token;

labeling each potential outcome event of the set of potential outcome events as an actual outcome event;

assigning the exposure event having the corresponding token and one or more actual outcome events having the corresponding token to either a control group or a treatment group of the network operation evaluation protocol; and executing one or more functions of the network operation evaluation protocol that map to the plurality of user inputs in a function mapping database, wherein the one or more functions are executed based on indications of successful or unsuccessful network operation authorizations of the one or more tokens corresponding to the one or more actual outcome events for the treatment group; and responsive to the network operation evaluation protocol identifying an increased accuracy in evaluating an updated trained network operation authorization model over a previous network operation authorization model, deploying the updated trained network operation authorization model for a new event.

\* \* \* \* \*